Nov. 6, 1928.  1,690,686

F. W. KRAFFT

CLUTCH

Filed Feb. 11, 1926

INVENTOR.
Frederick W. Krafft.
BY
Townsend, Loftus & Abbett
ATTORNEYS.

Patented Nov. 6, 1928.

1,690,686

UNITED STATES PATENT OFFICE.

FREDERICK W. KRAFFT, OF BERKELEY, CALIFORNIA.

CLUTCH.

Application filed February 11, 1926. Serial No. 87,540.

This invention relates to clutches and particularly to clutches of the jaw-clutch type for transmitting power from a drive shaft to a driven shaft, to a gear, a pulley or other member to be driven.

The object of the present invention is to generally improve and simplify the construction and operation of clutches of the character described, to provide a clutch consisting of a driving member and a driven member, to provide jaws in the driven member which are radially movable with relation to jaws or teeth on the driving member and further to provide means whereby the radially movable jaws may be positively moved into or out of engagement with the teeth of the driving member.

One form which my invention may assume is exemplified in the acompanying drawings in which—

Figure 1:
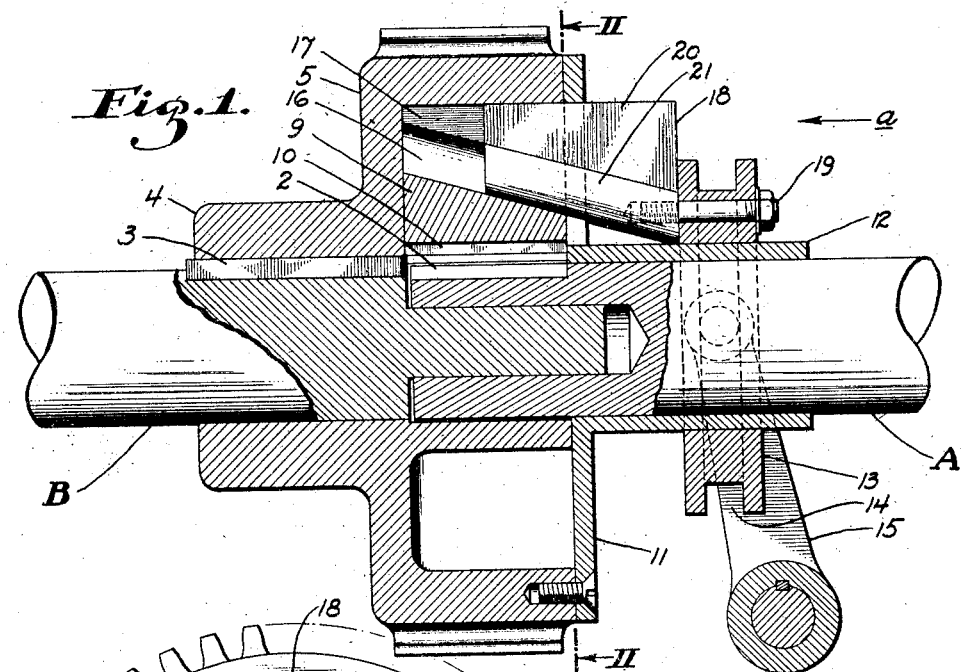
Fig. 1 is a central vertical longitudinal section through the clutch.

Referring to the drawings in detail and particularly Fig. 1, A indicates a driving shaft on one end of which is formed a plurality of exterior teeth such as indicated at 2. Aligned with the shaft A and abutting the toothed end thereof is a driven shaft B, and keyed as at 3 or otherwise secured thereto, is a hub member 4 on which is supported a cylindrical clutch member 5. Formed in one face of the clutch member 5 is a plurality of pockets such as indicated at 6, 7 and 8. Radially movable in each pocket is a jaw member 9 and formed on the inner face of each jaw member are teeth 10 which are adapted to be brought into or out of driving engagement with relation to the teeth 2 on the drive shaft.

Figure 2:
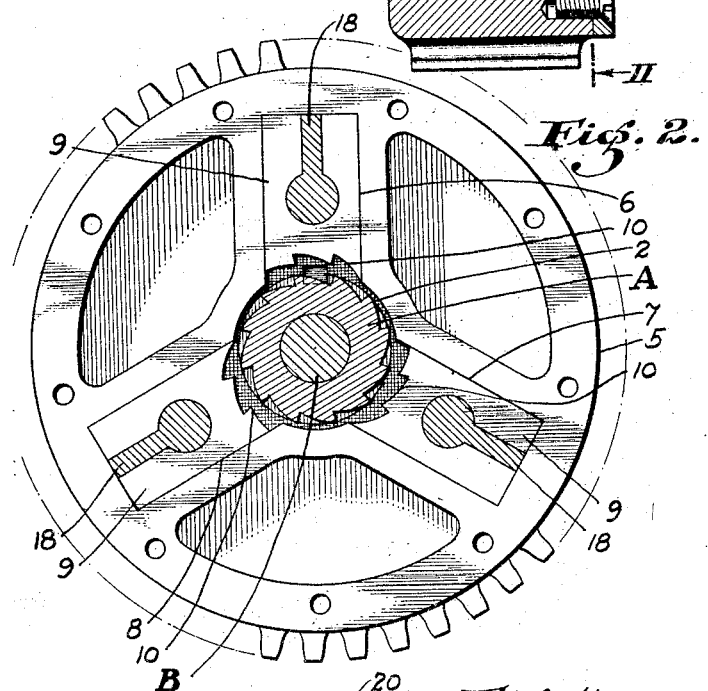
Fig. 2 is a cross-section on line II—II, Fig. 1.
Figure 3:
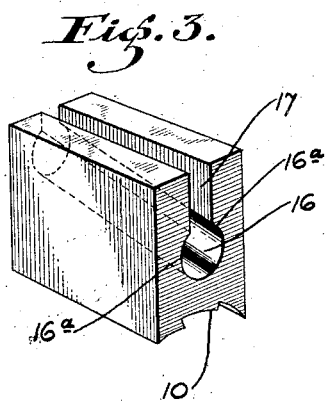
Fig. 3 is a perspective view of one of the jaws.
Figure 4:
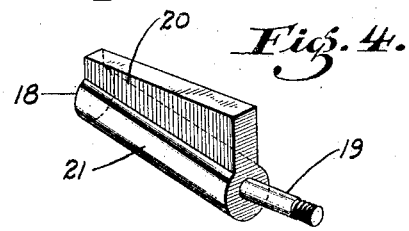
Fig. 4 is a perspective view of one of the jaw actuating members.

Secured on one end of the clutch member 5 to prevent removal of the jaw members 9 is a plate 11. Formed thereon is a hub or sleeve extension 12 which surrounds the drive shaft A and which is freely rotatable with relation thereto, and slidably mounted longitudinally on the sleeve is a shifting collar 13 in which is formed an annular groove 14 which cooperates with a shifting fork 15. The shifting collar is provided for the purpose of moving the jaw members 9 radially into or out of engagement with the teeth 2 of the drive shaft. This is accomplished as follows: By referring to Fig. 3 it will be noted that each jaw member 9 is provided with an angularly disposed hole therein, such as indicated at 16 which is circular in cross-section and that this hole is in communication with a longitudinally extending slot 17. Again, by referring to Figs. 1, 2 and 4 it will be noted that the shifting collar carries three jaw-actuating members generally indicated at 18 which are secured to the shifting collar by means of bolts 19. The jaw-actuating members are particularly illustrated in Fig. 4. They consist of a plate 20 which fits the slot 17 and an inclined rounded bottom section 21 which fits the hole 16. The bolt 19 is secured in the end of the rounded member 21 and extends through the shifting collar, being there secured by a nut or other suitable means. The end plate 11 which secures the jaws 9 against removal is provided with a plurality of openings of a shape similar to a cross-section of the member 18 at its large end, there being three of these openings to receive the members 18. The members 18, or, in other words, the plates 20, and the rounded bottom portions 21 are longitudinally movable with the shifting collar 13 as they are secured thereto. When the collar is shifted in a direction of arrow $a$, see Fig. 1, the inclined rounded members 21 engage the bottom portions of the rounded inclined openings 16 of the respective jaws and the jaws are accordingly forced radially inward to a position where their teeth 10 will engage the teeth 2 of the driving shaft. A positive driving connection is thus formed between the driving shaft A and the clutch member 5 and the shaft B is rotated as the clutch member is keyed thereto as indicated at 3.

Conversely, if the shifting collar is moved longitudinally in the direction opposite to arrow $a$ the upper surfaces of the members 21 engage the upper surfaces 16$^a$ of the rounded holes in the jaw members and the jaws are accordingly moved radially in an outward direction so that the teeth 10 are freed with relation to the teeth 2 and the driving connection is thus broken. The inclined planes presented by the members 21 and 16 are preferably arranged on such an angle that the movement of the members is assured. An angle of 45° is too great, as it would interfere with easy working of the shifting levers. An angle less than forty-five degrees, for instance, thirty or less, entirely eliminates this trouble. The jaw members are positively locked in driving engagement with the shaft A when the shifting collar and members 18 are moved inwardly and are positively released when the shifting collar and members 18 are moved outwardly, as the inclined surfaces formed between the two members causes a positive inward and outward movement of the jaws. This clutch is positive and insures a powerful instant grip.

In the present instance the clutch is shown so arranged that power may be transmitted from a drive shaft to a driven shaft, but it is obvious that the clutch member 5 might represent a pulley, a gear or any other member which it might be desired to intermittently drive. Under such conditions shaft A might be continued and the member 5 would then be mounted for free rotation on the shaft or might be mounted in a bearing independent thereof. In any instance, it is obvious that the clutch member 5 is freely rotatable with relation to the driving member or shaft A and that a driving connection is only formed when the jaws 9 are moved into positive engagement with the driving member.

While certain features of my invention have been more or less specifically described and illustrated I wish it understood that various changes may be resorted to within the scope of the appended claims. I also wish it understood that the material and finish of the parts employed may be such as the experience and judgment of the manufacturer may dictate or various conditions may demand.

Having thus described my invention what I claim and desire to secure by Letters Patent is—

1. In a device of the character described, a driving shaft member having a plurality of teeth formed on its exterior surface, a clutch member surrounding the shaft member and freely turnable with relation thereto, a plurality of jaw members radially movable in the clutch member, an end plate on the clutch securing the jaw members against longitudinal movement, said end plate having a plurality of openings formed therein, and each jaw member being longitudinally slotted and having a pair of inclined shoulders formed therein extending from end to end, a shifting collar longitudinally movable with relation to the driving shaft member, jaw guiding members secured to the shifting collar, said jaw guiding members extending through the openings in the end plate and engaging the inclined shoulders in the jaw members to impart a radial movement to the jaw members in an outward or inward direction, and teeth on each jaw member engageable with the teeth on the driving shaft member.

2. In a device of the character described, a driving shaft member having a plurality of teeth formed on its exterior surface, a clutch member surrounding the shaft member and freely turnable with relation thereto, a plurality of jaw members radially movable in the clutch member, an end plate on the clutch securing the jaw members against longitudinal movement, said end plate having a plurality of openings formed therein, and each jaw member being longitudinally slotted and having a pair of inclined shoulders formed therein extending from end to end, a shifting collar longitudinally movable with relation to the driving shaft member, a plurality of radially disposed plates secured to the shifting collar, an inclined jaw guiding member on each plate, said plates and jaw guiding members extending through the openings in the end plate, and said jaw guiding members engaging the inclined shoulders in the jaw members to impart a radial movement to the jaw members in an outward or inward direction, and teeth on each jaw member engageable with the teeth on the driving shaft member.

FREDERICK W. KRAFFT.